United States Patent [19]
Tokui

[11] Patent Number: 5,231,496
[45] Date of Patent: Jul. 27, 1993

[54] AUTOMATIC BRIGHTNESS LIMITER CIRCUIT

[75] Inventor: Satoru Tokui, Tokyo, Japan

[73] Assignee: Pioneer Electronic Corporation, Tokyo, Japan

[21] Appl. No.: 833,518

[22] Filed: Feb. 11, 1992

[30] Foreign Application Priority Data

Feb. 12, 1991 [JP] Japan .................................. 3-041183

[51] Int. Cl.⁵ .............................................. H04N 5/57
[52] U.S. Cl. ..................................... 358/168; 358/169
[58] Field of Search ............... 358/168, 169, 171, 242, 358/245, 188

[56] References Cited

U.S. PATENT DOCUMENTS 4,587,554 5/1986 Tamura et al. ...................... 358/168
4,694,225 9/1987 Tomii et al.
4,901,156 2/1990 Yook.

FOREIGN PATENT DOCUMENTS 0250123 12/1987 European Pat. Off.
3222266 12/1983 Fed. Rep. of Germany ...... 358/168
63-55683 4/1988 Japan.

Primary Examiner—James J. Groody
Assistant Examiner—David E. Harvey
Attorney, Agent, or Firm—Sughrue, Mion, Zinn, Macpeak & Seas

[57] ABSTRACT

A multi-screen display apparatus has a lowest ABL level priority circuit which, receiving ABL signals from a plurality of display units constituting the display apparatus, provides a lowest ABL signal to the display units. At the presetting stage, while being supplied with the same video signal for a white picture, offset ABL voltages of the respective display units are adjusted to produce the uniform brightness over the entire multi-screen. The offset data thus determined are stored in the respective display units. When the display apparatus is in actual use, in each display unit the offset voltage is added to the lowest ABL voltage to produce an offset-added ABL voltage to be used for adjusting brightness and/or contrast of the display unit.

17 Claims, 3 Drawing Sheets

AUTOMATIC BRIGHTNESS LIMITER CIRCUIT

BACKGROUND OF THE INVENTION

The present invention relates to a display apparatus in which a large multi-screen is constituted by a plurality of display units such as projection TVs. More particularly, the invention is directed to an ABL (Automatic Brightness Limiter) circuit which automatically adjusts brightness or contrast of a picture displayed on each display unit.

As shown in FIG. 4, in a multi-vision-type display apparatus, a large screen is formed by a plurality of display units U1-U9 arranged, e.g., in matrix form, which receive related video signals, whereby an enlarged single picture is displayed over the entire screen or different pictures are displayed on the respective display units U1-U9.

Each of the display units U1-U9 has projectors for emitting three light beams corresponding to respective color video signals of R, G and B. The three light beams are projected onto a projection screen using, e.g., a Fresnel lens, to reproduce a picture. To adjust the brightness of the screen, an ABL circuit is provided in each of the display units U1-U9.

However, when a large screen is formed by combining a plurality of display units U1-U9 in the above manner, there arises such a problem that the screen brightness varies from one display unit to another. Assume now a case in which a picture as shown in FIG. 4 is displayed on the display units U1-U9; that is, a major white portion W and a small black portion B are displayed on the display unit U9. Since a conventional video display circuit performs the ABL operation on a single unit basis, the ABL operation will be actuated in the display unit U9 having the large white portion W, thereby causing the black portion B to be further darkened. Since the brightness limitation is not actually effected in the display units U1-U8, no darkening such as in the black portion B of the display unit U9 will not occur. Thus, there is inconsistency in the display of the same black color between the display units U1-U8 and the display unit U9 and, as a result, the displayed picture on the multi-screen becomes unnatural.

To overcome this inconvenience, there has been developed a video display circuit in which a common ABL signal is applied to respective display units U1-U9 to equalize their brightness (Japanese Utility Model Application Unexamined Publication No. Sho. 63-55683).

However, since this conventional video display circuit operates so as to forcibly provide the common ABL signal, there is a possibility that the screens of some display units become too dark. This is explained more specifically. The minimum ABL voltage among the ABL voltages of the display units U1-U9 is employed as the commen ABL signal. Therefore, while the brightness limitation is properly effected in the display units having ABL voltages close to the minimum ABL voltage, the brightness remains dark in the display units having higher ABL voltages.

SUMMARY OF THE INVENTION

An object of the present invention is to provide an ABL circuit which can adjust the brightness and/or contrast of a plurality of display units constituting a multi-screen display apparatus so as to provide uniform brightness over the entire multi-screen.

According to the invention, an automatic brightness limiter circuit for use in each of a plurality of display units constituting a multi-screen display apparatus having a lowest ABL level priority circuit which provides a lowest ABL voltage receiving ABL voltages from the plurality of display units, comprises:

means for producing an ABL voltage which reflects brightness of a display unit having said automatic brightness control circuit;

means for storing offset data corresponding to a difference of the ABL voltage of the display unit and a minimum ABL voltage among ABL voltages of the plurality of display units when the plurality of display units are adjusted to exhibit same brightness while receiving a same video signal;

means for producing an offset voltage based on the offset data;

means for receiving the lowest ABL voltage from the lowest ABL level priority circuit; and means for adding the offset voltage to the lowest ABL voltage to produce an offset-added ABL voltage to be used for adjusting brightness and/or contrast of the display unit.

Further, according to the invention, a method of adjusting brightness and/or contrast of a plurality of display units constituting a multi-screen display apparatus having a lowest ABL level priority circuit which provides a lowest ABL voltage receiving ABL voltages from the plurality of display units, comprises the steps of:

supplying a same video signal to the plurality of display units;

determining and storing offset data of each of the plurality of display units, the offset data corresponding to a difference between an ABL voltage of each display unit and a minimum ABL voltage among ABL voltages of the plurality of display units when the plurality of display units are adjusted to exhibit same brightness;

producing, in each display unit, an offset-added ABL voltage by adding an offset voltage produced based on the stored offset data to the lowest ABL voltage provided from the lowest ABL level priority circuit; and adjusting brightness and/or contrast of the plurality of display units based on the offset-added ABL voltages.

DESCRIPTION OF THE PREFERRED EMBODIMENT

A preferred embodiment of the present invention is described with reference to the accompanying drawings.

Figure 1:
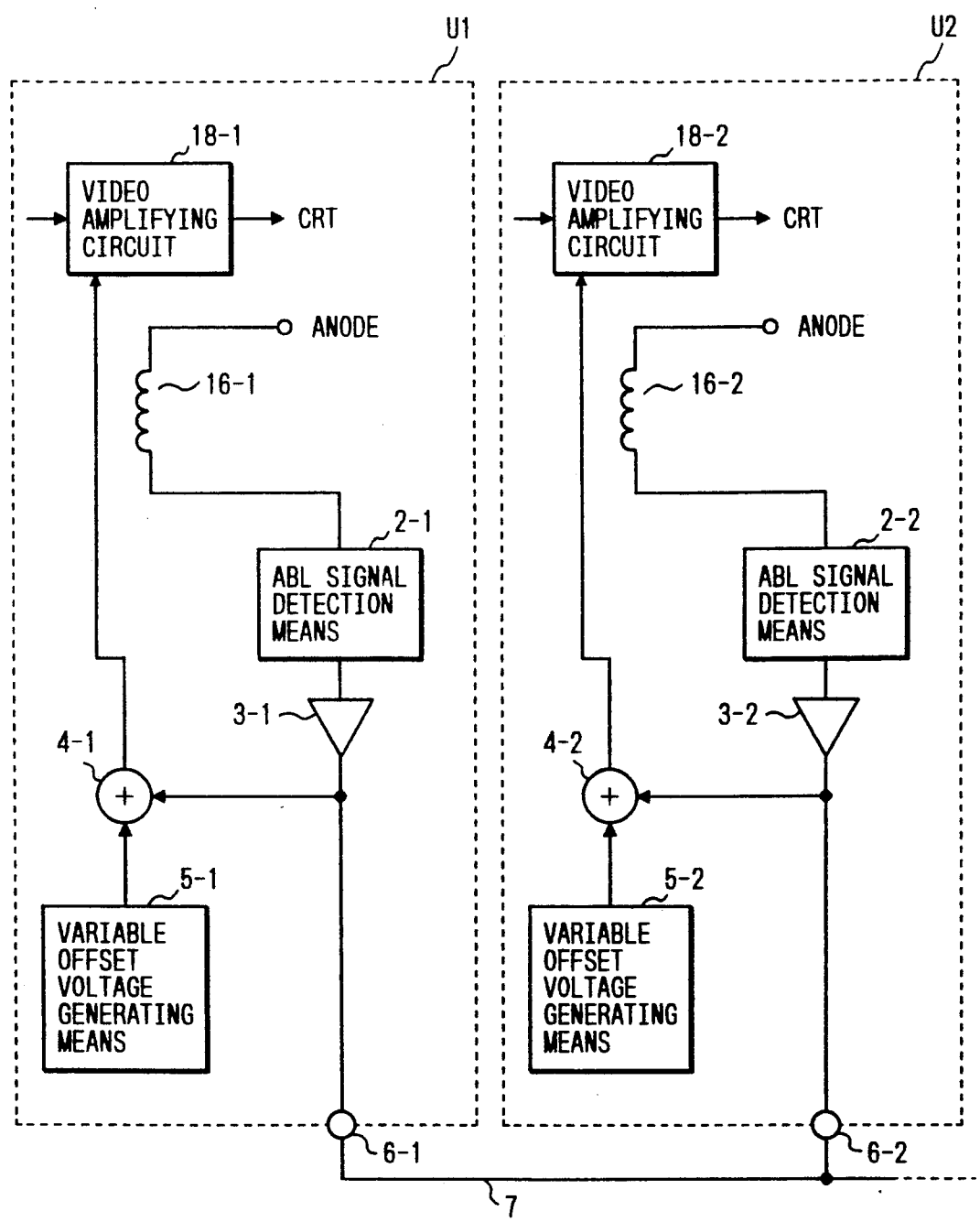
FIG. 1 is a block diagram showing display units each having an ABL circuit according to the present invention.

FIG. 1 shows a basic construction of an ABL circuit according to an embodiment of the invention, which is incorporated in each of display units U1, U2, etc. constituting a display apparatus. The display unit U1 includes: an ABL signal detection means 2-1 for detecting an ABL signal sent from a flyback transformer 16-1; a buffer 3-1 for preventing reverse flow of an ABL voltage from the other display units U2 etc. to the ABL signal detection means 2-1 via an external connection terminal 6-1; a manually adjustable variable offset voltage generating means 5-1 for generating an offset voltage for the display unit U1; and an offset voltage adding means 4-1 for adding the offset voltage from the variable offset voltage generating means 5-1 to an ABL voltage sent from the buffer 3-1 or externally provided via the terminal 6-1. A resulting offset-added ABL voltage is provided to a video amplifying circuit 18-1. Although the display unit U1 further includes a CRT and TV circuits such as a brightness adjusting circuit and a synchronizing circuit, these components are not directly relevant to the invention and a description for those is therefore omitted.

The other display units U2 etc. have the same construction.

The external connection terminals 6-1, 6-2, etc. of the respective display units U1, U2, etc. are interconnected by a connection cable 7, which is connected to a lowest ABL level priority circuit such as a video display circuit disclosed in above-mentioned Japanese Utility Model Application Unexamined Publication No. Sho. 63-55683, which is hereby incorporated by reference for a more detailed understanding of the lowest ABL level priority circuit. A common, i.e., smallest ABL signal is supplied from the lowest ABL level priority circuit to each of the display units U1, U2, etc.

To pre-adjust the brightness of the display units U1, U2, etc., the same video signal is supplied to each of the display units U1, U2, etc. to display a white picture on each display unit. If there is a variation among the ABL voltages of the display units U1, U2, etc., according to the embodiment, a person in charge of the adjustment, while observing the screens of the display units U1, U2, etc., operates the variable offset voltage generating means 5-1 of, e.g., the display unit U1 to apply an appropriate offset voltage to the offset voltage adding means 4-1 so that the brightness of the display unit U1 becomes equal to the display unit producing the minimum ABL voltage. The offset voltage adding means 4-1 adds the offset voltage output from the variable offset voltage generating means 5-1 to the ABL voltage output from the ABL signal detection means 2-1, and the resulting offset-added ABL voltage is provided to the video amplifying circuit 18-1.

By subjecting the remaining display units to the similar adjustment, inconsistency in brightness among the display units U1, U2, etc. is corrected, and all the display units can produce pictures having uniform brightness.

Figure 2:
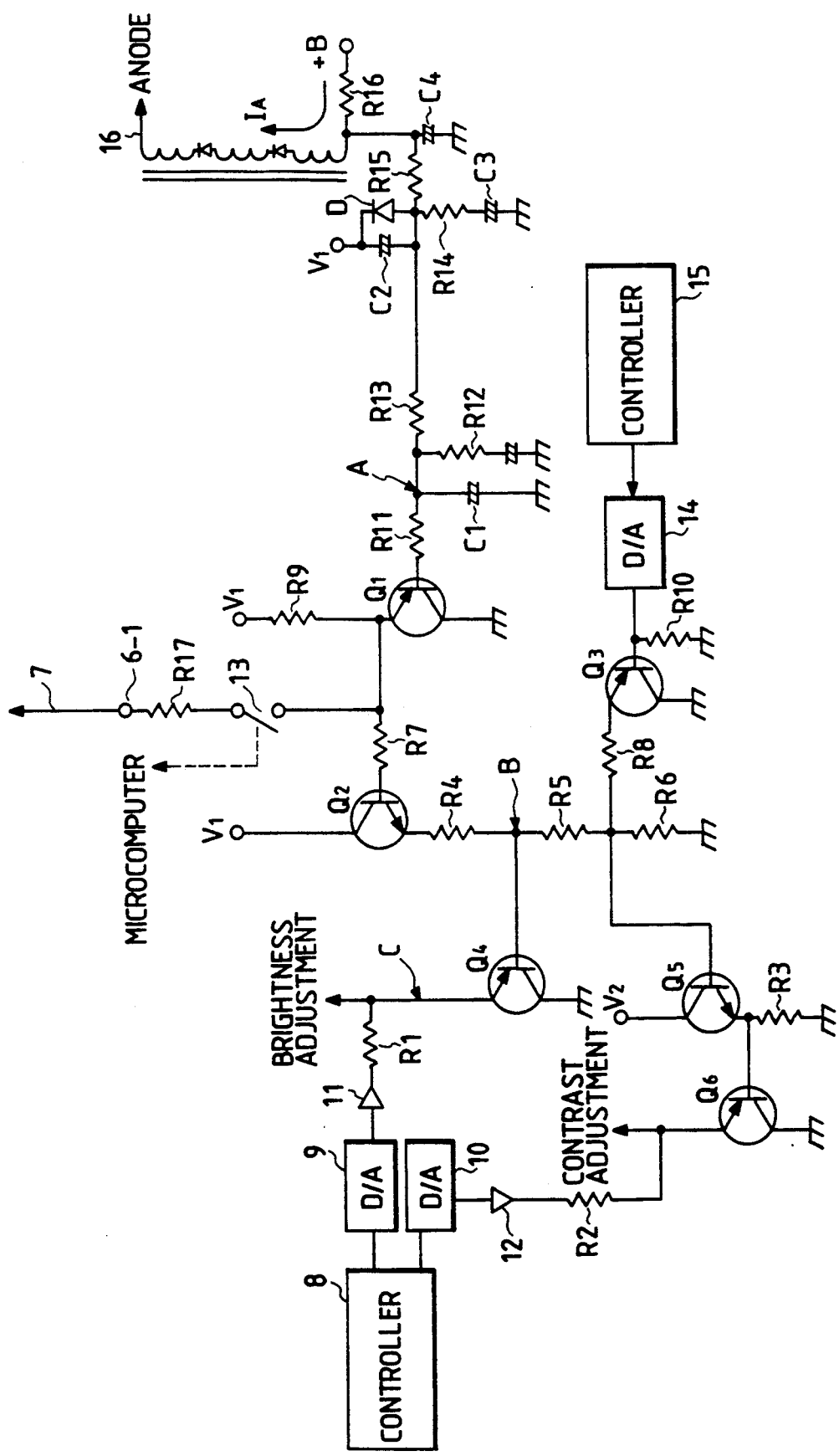
FIG. 2 is a circuit diagram showing in detail the ABL circuit according to the invention.

FIG. 2 shows a specific circuit of the ABL circuit according to the embodiment, which is employed in all the display units U1, U2, etc.

Figure 3:
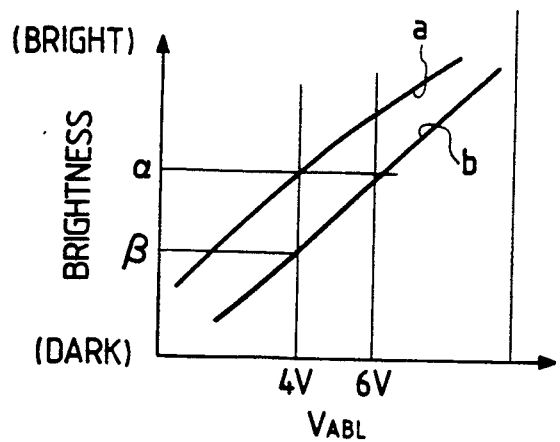
FIG. 3 is a graph illustrative of a relationship between an ABL voltage and brightness.
Figure 4:
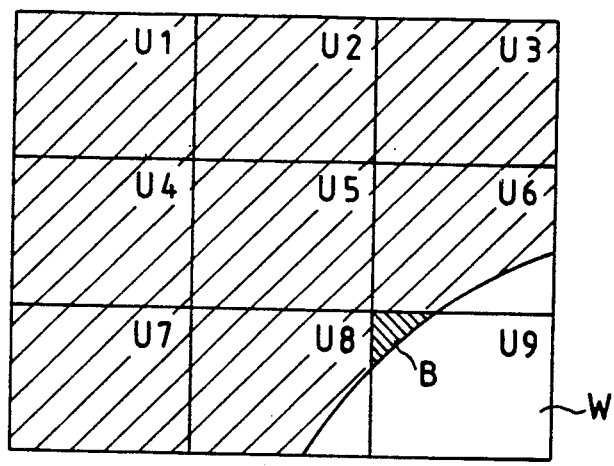
FIG. 4 is a diagram illustrative of an exemplary picture displayed on a multi-vision-type display apparatus.
Figure 5:
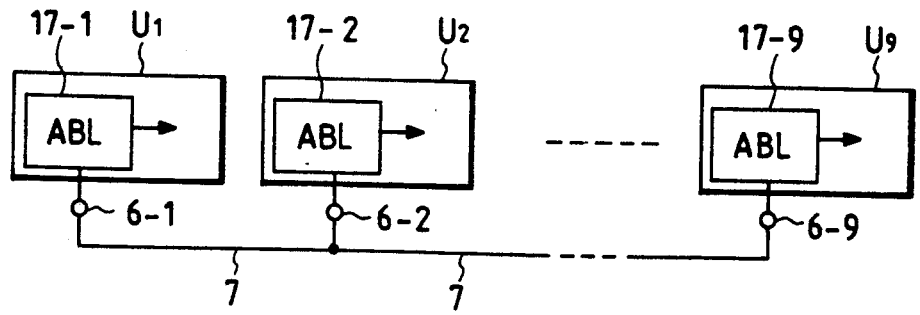
FIG. 5 is a block diagram showing an exemplary conventional video display circuit.

Referring to FIG. 3, it is assumed that the display unit U1, which has a relationship a between the ABL voltage $V_{ABL}$ (a voltage at point C in FIG. 2) and screen brightness, exhibits a brightness $\alpha$ at an ABL voltage $V_{ABL}$ of 4 V. In this case, the lowest ABL level priority circuit operates to restrict the ABL voltage of the display unit U2, which has a $V_{ABL}$-screen brightness characteristic b, to 4 V, thereby setting the brightness of the display unit U2 to $\beta$. To make the brightness of the display unit U2 equal to $\alpha$ of the display unit U1, the ABL voltage of the display unit U2 should be increased to 6 V, requiring an offset voltage of 2 V (6 V − 4 V).

To this end, when the respective display units U1, U2, etc. are pre-adjusted while being supplied with the same video signal to produce a white picture, each offset voltage is stored in a memory of a built-in controller 15 of the individual display unit. When the display apparatus is in actual use, the offset data, which corresponds to 2 V in the above example, is output from the controller 15. The offset data is converted to an analog voltage by a D/A converter 14, and then applied to the base of a transistor $Q_3$. The transistor $Q_3$ acts to increase a voltage at point B in accordance with the received offset voltage, and the increased voltage at point B in turn increases a voltage at point C via a transistor $Q_4$, making the screen brighter. As a result, the brightness of the display unit U2 is increased, i.e., equated to the brightness of the display unit U1.

In FIG. 2, the lowest ABL signal is provided via a line 7 and a terminal 6-1. A switch 13 is kept open during the presetting of the offset voltage, and is kept closed during the usual operation. Transistors $Q_1$, $Q_2$ constitute not only part of the lowest ABL level priority circuit, but also the buffer 3-1. A current flows from a voltage supply $V_1$ through the transistor $Q_2$ and resistors $R_4$, $R_5$ and $R_6$, and a voltage at point B is changed in accordance with the base voltage of the transistor $Q_2$. The lowest ABL voltage is also applied to the collector of the transistor $Q_1$. If the subject display unit U1 exhibits a brighter picture, a voltage at point A is high and so the transistor $Q_1$ is close to an off state. Therefore, the current through the transistor $Q_2$ is determined by the lowest ABL signal rather than the voltage at point A.

Microcomputers (see FIG. 2) are incorporated in the respective display units U1, U2, etc. and interconnected via data lines. The microcomputer controls the switch 13. Further, detecting the ABL voltage at the time of the presetting, the microcomputer controls the controller 15 to store the offset data that corresponds to the difference between the detected ABL voltage of the subject display unit (U1) and the ABL voltage of the display unit producing the minimum ABL voltage.

Capacitors $C_1$, $C_2$, a diode D, resistors $R_{12}$, $R_{13}$, $R_{14}$, a capacitor $C_3$, and other elements constitute a filter for the ABL signal detection and a clamp circuit which clamps the voltage at point A so that it does not exceeds the voltage $V_1$.

Resistors $R_5$, $R_6$, $R_8$, $R_{10}$, the transistor $Q_3$ correspond to the offset voltage adding means 4-1. The controller 15 and the D/A converter 14 correspond to the variable offset voltage generating means 5-1. $R_{16}$ designates an ABL signal detection resistor and thus corresponds to the ABL signal detection means 2-1.

A controller 8, D/A converters 9, 10, buffers 11, 12, resistors $R_1$, $R_2$, $R_3$, transistors $Q_4$, $Q_5$, $Q_6$ constitute a brightness/contrast adjusting means. An operating unit (not shown) having a brightness button, a contrast button, etc. is connected to the controller 8. The controller 8 operates to adjust the brightness and contrast levels in accordance with a viewer's instruction that is input through the operating unit.

Although the brightness adjustment by the transistor $Q_4$ is mainly described above, the contrast adjustment by the transistors $Q_5$, $Q_6$ may similarly be performed by controlling, via the transistor $Q_3$, the base voltage of the transistor Q5 in accordance with the offset data output from the controller 15.

What is claimed is:

1. An automatic brightness limiter circuit in each of a plurality of display units constituting a multi-screen display apparatus having a lowest ABL level priority circuit for receiving a plurality of ABL voltages from the plurality of display units, respectively, and for outputting a minimum received ABL voltage, said automatic brightness limiter circuit comprising:

means for producing an ABL voltage corresponding to a brightness of a display unit having said automatic brightness limiter circuit;

means for producing and storing offset data corresponding to a difference between the ABL voltage of the corresponding display unit and a first minimum ABL voltage output by the plurality of display units during a first mode in which the plurality of display units are adjusted to exhibit a same brightness while receiving related video signals;

means for producing an offset voltage based on the offset data;

means for receiving a second minimum ABL voltage from the lowest ABL level priority circuit during a second mode that is different from said first mode; and means for adding the offset voltage to the second minimum ABL voltage to produce an offset-added ABL voltage for adjusting at least one of brightness and contrast of the display unit.

2. In an automatic brightness limiter circuit provided in each of a plurality of display units constituting a multi-screen display apparatus, for automatically adjusting at least one of brightness and contrast of the associated display unit, the improvement comprising: 'means for producing an offset voltage based on a difference between an ABL voltage of the display unit and a first minimum ABL voltage output by said plurality of display units during a first mode in which each of said display units is adjusted to exhibit a same brightness while receiving related video signals; and means for adding said offset voltage of the associated display unit to a second minimum ABL voltage output by the plurality of display units during a second mode that is different from said first mode as a reference voltage.

3. A method of adjusting at least one of brightness and contrast of a plurality of display units constituting a multi-screen display apparatus having a lowest ABL level priority circuit for receiving ABL voltages from the plurality of display units and for outputting a minimum ABL voltage therefrom, said method comprising the steps of:

supplying related video signals to the plurality of display units;

determining and storing offset data for each of the plurality of display units, the offset data corresponding to a difference between an ABL voltage of each display unit and a first minimum ABL voltage among ABL voltages of the plurality of display units during a first mode in which the plurality of display units are adjusted to exhibit a same brightness;

producing, in each display unit, an offset-added ABL voltage by adding an offset voltage, produced based on the stored corresponding offset data, to a second minimum ABL voltage provided from the lowest ABL level priority circuit during a second mode that differs from said first mode; and adjusting at least one of brightness and contrast of each of the plurality of display units based on corresponding offset-added ABL voltages.

4. An automatic brightness limiter circuit, according to claim 1, further comprising:

offset voltage generating means for allowing a user, while observing said plurality of display units during said first mode, to set a desired offset voltage such that a brightness of a corresponding display equals a brightness of a display unit that output said first minimum ABL voltage.

5. An automatic brightness limiter circuit, according to claim 1, further comprising:

means for adjusting a brightness of each display unit while all of said display units are receiving related video signals.

6. An automatic brightness limiter circuit, according to claim 2, said improvement further comprising:

means for producing and storing offset data, for a corresponding display unit, based on a difference between an ABL voltage output by said corresponding display unit and said first minimum ABL voltage output by said plurality of display units, said offset voltage being based on said offset data.

7. In an automatic brightness limiter circuit, according to claim 2, said improvement further comprising:

means for receiving said second minimum ABL voltage from the lowest ABL level priority circuit.

8. In an automatic brightness limiter circuit, according to claim 2, wherein said means for adding the offset voltage to the second minimum ABL voltage produces an offset-added ABL voltage to be used for adjusting at least one of brightness and contrast of said display unit.

9. In an automatic brightness limiter circuit, according to claim 1, wherein said lowest ABL level priority circuit outputs said first minimum ABL voltage during an initializing mode and outputs said second minimum ABL voltage during normal mode after said initializing mode.

10. In an automatic brightness limiter circuit, according to claim 2, further comprising:

a lowest ABL level priority circuit for receiving output signals from said plurality of display units, said level priority circuit outputting said first minimum ABL voltage, during an initializing mode, and outputs said second minimum ABL voltage during a normal mode after said initializing mode.

11. A method of adjusting at least one of brightness and contrast, according to claim 3, further comprising the steps of:

producing, from said lowest ABL level priority circuit, said first minimum ABL voltage during an initializing mode, prior to determining said offset data, and producing, from said lowest ABL level priority circuit, said second minimum ABL voltage during a normal mode before determining said offset data.

12. In an automatic brightness limiter circuit, according to claim 9, wherein said offset data is obtained during said initializing mode and said offset voltage is added to the second minimum ABL voltage during said normal mode.

13. In an automatic brightness limiter circuit, according to claim 10, the improvement further comprising:

means for producing and storing offset data, during said initializing mode, corresponding to said difference, said offset voltage being produced, during said normal mode, based on said offset data.

14. A method of adjusting at least one of brightness and contrast, according to claim 3, wherein the offset data is determined during said initializing mode and said offset voltage is added to the second minimum ABL voltage during said normal mode.

15. In an automatic brightness limiter circuit, according to claim 1, wherein said first minimum ABL voltage is obtained during an initializing mode in which said plurality of display units are adjusted to the same brightness and said second minimum ABL voltage is obtained during a normal mode after said initializing operation.

16. In an automatic brightness limiter circuit, according to claim 2, wherein said first minimum ABL voltage is obtained during an initializing operation in which said plurality of display units are adjusted to said same brightness and said second minimum ABL voltage is obtained during normal operation after said initializing operation.

17. A method of adjusting at least one of brightness and contrast, according to claim 3, wherein said first minimum ABL voltage is obtained during an initializing operation in which said plurality of display units are adjusted to said same brightness and said second minimum ABL voltage is obtained during normal operation after said initializing operation.

* * * * *